UNITED STATES PATENT OFFICE.

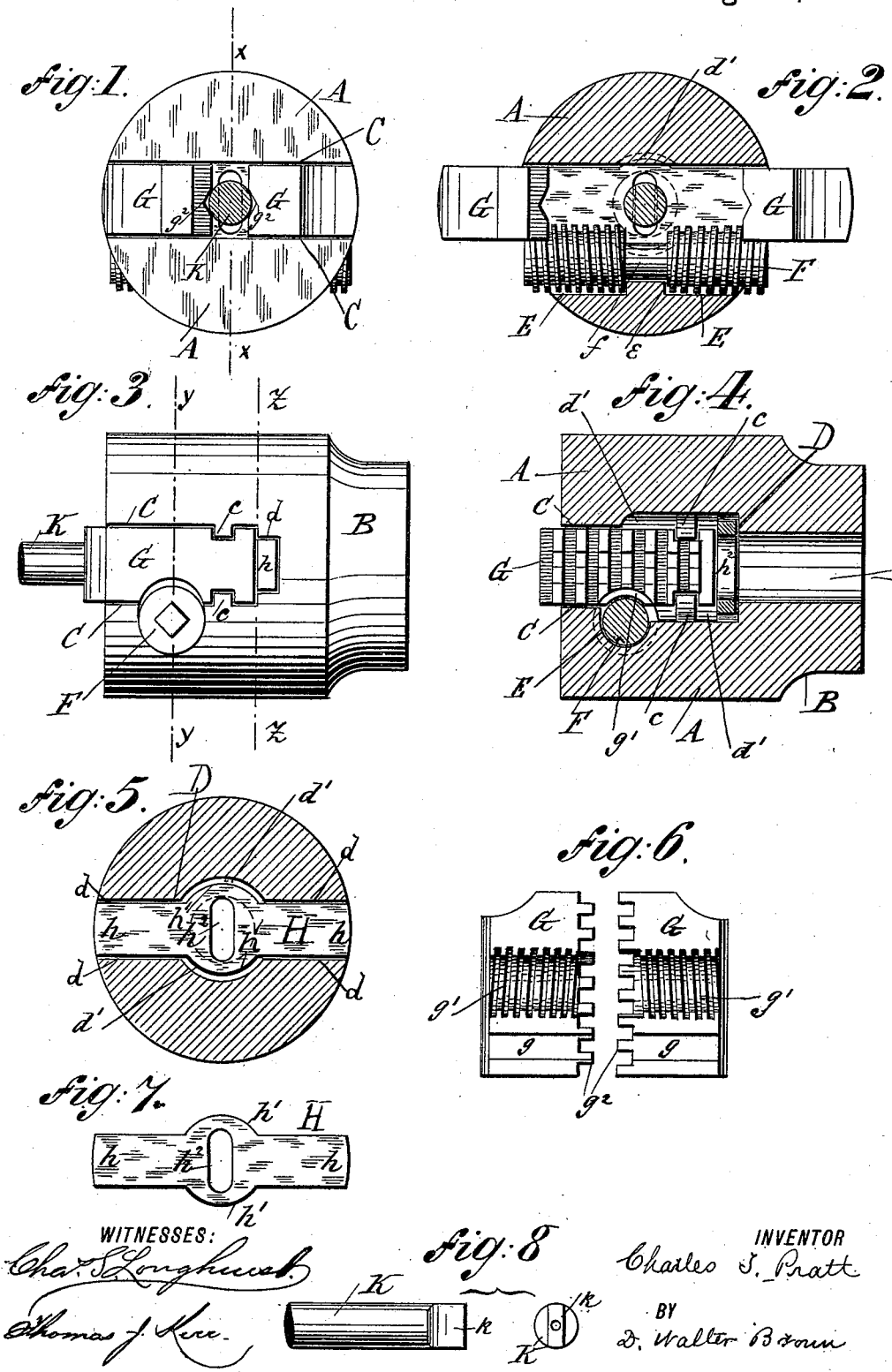

CHARLES T. PRATT, OF NEW HARTFORD, NEW YORK.

DRILL-CHUCK.

SPECIFICATION forming part of Letters Patent No. 434,460, dated August 19, 1890.

Application filed April 29, 1890. Serial No. 349,951. (No model.)

*To all whom it may concern:*

Be it known that I, CHARLES T. PRATT, a citizen of the United States, and a resident of New Hartford, in the county of Oneida and State of New York, have invented certain new and useful Improvements in Chucks for Drills, of which the following is a specification.

My invention relates to drill-chucks; and the object of the improvement is particularly to provide means for giving positive rotation to the drill independently of the jaws of the chuck, whereby the strain on the jaws is diminished and their wear lessened. When the grip of the jaws on the drill is relied on alone to revolve the drill a great twisting and grinding strain is brought upon the jaws, by which they are unequally worn, and the accurate alignment of the drill in the chuck is rendered difficult or impossible. If, to obviate this, a socket for the end of the drill is made in the chuck for the purpose of imparting motion to the drill directly from the chuck and thereby relieving the strain on the jaws, then, should the end of the drill be formed out of true, the jaws cannot center the drill in the chuck without thowing the drill out of its true alignment in the axis of rotation. To overcome these difficulties, I insert a plate or piece, which has a slot to receive the end of the drill, in a chamber in the chuck in such a manner that the piece always is capable of a certain amount of motion in the chuck in a direction transverse to the axis of rotation. The piece revolves with the chuck, and by its engagement upon the end of the drill imparts positive rotation to the drill and relieves the strain upon the jaws. At the same time, should the end of the drill be out of true, then when the jaws are tightened on the drill the piece moves a little to the one side or the other and thus compensates for the want of trueness in the drill end, and thereby permits the jaws to accurately center and align the drill in the chuck.

The improvement is particularly useful in the case of large drills, where the twisting strain is great, but is applicable to all sizes of drills.

While the drawings which accompany the specification, and to which the description in detail more particularly refers, show one particular form of chuck, it is to be clearly understood that the movable piece is equally applicable to a variety of chucks, and is not restricted to a chuck of the special form shown.

Referring to the drawings, Fig. 1 is an end view of the chuck, showing the jaws gripping the stock of a drill. Fig. 2 is a cross section of the chuck, on the line *y y* of Fig. 3, showing the screw, and the jaws being quite widely open. Fig. 3 is a longitudinal elevation of the chuck, showing the manner in which the jaws are guided. Fig. 4 is a longitudinal section (on the line X X of Fig. 1) of the chuck, to show the form of the chamber in which the movable piece is placed. Fig. 5 is a cross-section on the line *z z* of Fig. 3, showing the movable piece in its chamber. Fig. 6 is a view of the jaws seen from below, and showing the sections of female threaded screws by which the jaws are made. Fig. 7 is a plan view of the movable piece. Fig. 8 is a broken elevation and end view of a drill.

The chuck A is formed of metal, preferably of steel, by any suitable process of manufacture. In shape the chuck A is preferably a cylinder with a conoidal portion B, which is bored, as at B', to fit an arbor, by which the chuck is revolved. In the chuck A is a deep rectangular slot or chamber C, which has parallel walls and extends diametrically through and through the chuck A. At a certain point on the walls of the slot C are parallel projections *c c*, which preferably extend from side to side of the chuck A, parallel to the face of said chuck, and form slides or guides for the jaws G G. The inner part of the slot C is formed into a chamber D, which is intended to receive the slotted movable piece H. This chamber D is formed, preferably, with rectangular passages *d d*, Fig. 5, connecting with a central circular enlarged chamber *d'*. This circular enlargement *d'* is carried some distance toward the face of the chuck A, or to the left, in Fig. 4, and the upper surface of the enlargement *d'* is carried gradually down to the slot C, while the under surface of the said enlargement *d'* is extended into the screw recess E. Thus the piece H can be inserted into the chamber D through the slot G. In one wall of the slot C is formed a semi-cylindrical recess E, Figs. 2 and 4, which extends transversely through the chuck A and parallel with the wall of the slot C and the guides $c\ c$. This recess E has its sides somewhat flattened at the upper part to admit the screw F, and the walls of the recess E are smooth and do not engage with the threads of the screw F. The said screw F consists substantially of two screws—one right-handed, the other left-handed—united by a spindle $f$ of smaller diameter than the screw parts. The threads of each part of the screw F are of equal pitch. The aforesaid screw recess E is formed with a semi-cylindrical collar $e$, which loosely fits the spindle $f$ of the screw F and prevents the said screw from lengthwise movement. The screw F has a socket in its head to receive any suitable key for the purpose of turning the screw.

In the aforesaid slot C are movably placed two jaws G G. Each jaw G has slots $g\ g$, which engage upon the guides $c\ c$, and thus secure to the said jaws a true rectilinear motion toward and from the axis of the chuck A. Each jaw G also has a section $g'$ of a female screw. Each female screw $g'$ is threaded to fit one-half of the screw F—that is, one jaw has right-hand threads and the other has left-hand threads. Thus when the jaws G G are in place in the chuck A and in engagement with the screw F, as seen in Figs. 1 and 2, the rotation of the screw F will cause both jaws to simultaneously approach or recede from the axis of the chuck with equal speed. The jaws G will therefore be moved so as to meet accurately in the center of the chuck, and in whatever position the jaws may be, they will center any drill that is held between them. On the inner face of each jaw G are a number of teeth $g^2$, each of which has a V-shaped notch to grasp the stock of a drill. These V-shaped notches are clearly shown in Figs. 1 and 2. A side view of the teeth is given in Fig. 6. The teeth of one jaw may be placed opposite the intervals between the teeth of the other jaw. It will be seen by Fig. 6 that the toothed faces of the jaws G are of considerable length, and since the teeth $g^2$ are formed with great care, so that the planes of the edges of the V-notches shall be exactly parallel to the axis of the arbor $B'$, it follows that when the jaws G G are closed upon a drill, as in Fig. 1, the drill will be exactly centered in the chuck and aligned parallel to the axis of rotation of the arbor $B'$. It is evident that the jaws G G are inserted in the chuck A by placing the toothed ends of the jaws in the slot C, engaging the recesses $g\ g$ upon the guides $c\ c$ and pressing the jaws inward until the female threads $g'\ g'$ engage with the screw F. Then by turning the said screw F by the key the jaws G G will be drawn into the chuck.

*The movable slotted piece.*—As hereinbefore stated, the chamber D is formed with rectangular channels connecting with a central circular chamber $d'$. In the said chamber D is inserted the movable piece H, Figs. 5 and 7. This piece H loosely fits the aforesaid chamber D, and has lateral rectangular extensions $h\ h$ corresponding to the rectangular passages $d\ d$ and an enlarged central part $h'$, corresponding generally to the shape of the circular chamber $d'$; but the said enlarged part $h'$ is somewhat narrower transversely to the chuck than the circular chamber $d'$, so that a space is left laterally between the part $h'$ and the walls of chamber $d'$, as seen in Fig. 5. Thus the piece H can have a certain movement transverse to the axis of the chuck A, such movement being limited by the contact of the part $h'$ against the walls of the chamber $d'$. The piece H is centrally slotted by a slot $h^2$ having its greatest length perpendicular to the extensions $h\ h$. It is evident that as the chuck A revolves the piece H will also revolve, and if the flattened end $k$ of the drill K be inserted in the slot $h^2$ the plate H will impart a positive rotary motion to the drill K and relieve the jaws G G of the twisting and grinding strain which comes upon them when the said jaws are relied on to rotate the drill. Should the flattened end $k$ of the drill K be out of center, then when the jaws G G are tightened and center and align the drill, as hereinbefore said, the plate H will move a little to one side or the other to accommodate the want of trueness in the drill end. The adjustment of the drill K is also facilitated by making the length of the flattened end $k$ a little less than the length of the slot $h^2$, whereby the drill end $k$ will have a little motion lengthwise of the slot $h^2$.

It is evident that instead of the particular form of the piece H (shown in Fig. 7) other shapes can be used. Thus the piece H might be rectangular in shape, and the chamber D also rectangular, but a little longer transversely to the check A than the piece H, thereby allowing of a little play of the piece H in the said chamber, the essence of my invention being that the plate H shall at all times have a certain motion in the chuck A transverse to the axis of rotation for the purpose of accommodating the plate H to the want of trueness in the flattened end of the drill.

I claim—

1. The combination of a drill-chuck having a transverse chamber and a slotted piece adapted to engage the end of a drill movably inserted in the said chamber so as to be capable of motion in the chamber in a direction transverse to the axis of the chuck, as described.

2. In a drill-chuck, a separable piece movable in the chuck transversely to the axis of rotation of the chuck, and the said piece having a slot to receive the end of a drill and extensions perpendicular to the slot, as described.

3. A drill-chuck having a chamber extending in a direction transverse to the axis of the chuck, a piece movably inserted in the chamber, the said piece having a slot to receive the end of a drill and a shoulder to engage with the walls of the chamber, as described.

4. A drill-chuck having a chamber extending in a direction transverse to the axis of the chuck, and the chamber having a wider and a narrower part, in combination with a slotted piece conforming in shape to the shape of the chamber and transversely movable in the said chamber, as described.

5. In a drill-chuck, a separable piece movable in the chuck in a direction transverse to the axis of the chuck, and the said piece having a slot to receive the end of a drill, in combination with means for gripping the drill in the chuck, as described.

6. In a drill-chuck, the combination of a slotted piece movable in the chuck transversely to the axis of the chuck, jaws for gripping, centering, and aligning the drill movably inserted in the chuck, and a right-handed and left-handed screw turning freely in the chuck, but engaging with threads on the jaws, so as to impart equal and simultaneous motion to each jaw, as described.

7. The combination of a drill having a flattened end, and a drill-chuck having a plate movable in the chuck transversely to the axis of the chuck, and the plate slotted to receive the flattened end of the drill, as described.

Signed at New Hartford, in the county of Oneida and State of New York, this 19th day of April, A. D. 1890.

CHARLES T. PRATT.

Witnesses:
CHAS. E. ROGERS,
J. ALLEN CUNNINGHAM.